(12) United States Patent
Solie (10) Patent No.: US 7,434,989 B2
(45) Date of Patent: Oct. 14, 2008

(54) SAW TEMPERATURE SENSOR AND SYSTEM

(75) Inventor: Leland P. Solie, Chetek, WI (US)

(73) Assignee: Applied Sensor Research & Development Corporation, Arnold, MD (US)

( * ) Notice: Subject to any disclaimer, the term of this patent is extended or adjusted under 35 U.S.C. 154(b) by 233 days.

(21) Appl. No.: 11/518,340

(22) Filed: Sep. 7, 2006

(65) Prior Publication Data

US 2007/0064765 A1     Mar. 22, 2007

Related U.S. Application Data (60) Provisional application No. 60/714,587, filed on Sep. 7, 2005.

(51) Int. Cl.
    *G01K 11/22*      (2006.01)
(52) U.S. Cl. ............ 374/117; 374/119; 374/E11.012; 374/E11.009; 73/1.82; 73/514.28
(58) Field of Classification Search .......... 374/117, 374/119, 143, 166, E11.012, E11.009, E11.011; 73/1.82, 514.28, 702–703
See application file for complete search history.

(56) References Cited

U.S. PATENT DOCUMENTS

| | | | | |
|---|---|---|---|---|
| 4,994,798 | A * | 2/1991 | McColl | 333/195 |
| 5,369,327 | A * | 11/1994 | Wallnofer et al. | 310/313 A |
| 6,003,378 | A * | 12/1999 | Scherr et al. | 73/703 |
| 6,299,920 | B1 * | 10/2001 | Saksena | 426/231 |
| 6,571,638 | B2 * | 6/2003 | Hines et al. | 73/702 |
| 6,806,808 | B1 * | 10/2004 | Watters et al. | 340/10.41 |
| 6,907,787 | B2 * | 6/2005 | Cook et al. | 73/700 |
| 7,100,451 | B2 | 9/2006 | Solie | |
| 7,165,455 | B2 * | 1/2007 | Magee et al. | 73/650 |
| 7,205,701 | B2 * | 4/2007 | Liu et al. | 310/313 R |
| 7,285,894 | B1 * | 10/2007 | da Cunha | 310/313 A |
| 2005/0198948 | A1 * | 9/2005 | Frank et al. | 60/330 |

(Continued)

OTHER PUBLICATIONS

Buff, Werner, "SAW Sensor System Application." 1995 IEEE Microwave Systems Conference, pp. 215218.

(Continued)

*Primary Examiner*—Edward Lefkowitz
*Assistant Examiner*—Bret Adams
(74) *Attorney, Agent, or Firm*—Schiff Hardin LLP (57) ABSTRACT

A temperature measurement system is characterized by at least one passive surface acoustic wave (SAW) temperature sensor. The sensor includes at least one piezoelectric substrate having an interdigital SAW transducer disposed upon the piezoelectric substrate for conversion of an RF signal into an acoustic wave and vice versa. At least three additional SAW elements are also disposed on the substrates in a manner such that they define two acoustic propagation paths that are non-parallel relative to the crystal axes of the substrates, and such that the temperature coefficients of delay in the two tracks differ. The SAW elements receive a signal from the SAW transducer and produce response signals. The response signals combine to produce a signal with a power spectral density such that the integrated power within each of two specified portions of the spectrum provides an indicator of the temperature. This change in the power spectral density of the sensor response signal is measured by an interrogator, and yields a measure of the temperature of the sensor.

5 Claims, 8 Drawing Sheets

U.S. PATENT DOCUMENTS

2007/0051176 A1* 3/2007 Liu .............................. 73/579
2007/0064765 A1* 3/2007 Solie .......................... 374/117

OTHER PUBLICATIONS

El-Shennawy, Kh, "Effect of Frequency Tolerance and Temperature Response on the Performance of Surface Acoustic Wave Sensor." IEEE Instrumentation and Measurement Technology Conference Brussels, Belgium, Jun. 4-6, 1996, pp. 243-246.

Buff, W., Rusko, M., Goroll, M., Ehrenpfordt, J. and Vandahl, T., "Universal Pressure and Temperature SAW Sensor for Wireless Applications." 1997 IEEE Ultrasonics Symposium, pp. 359-362.

Scholl, G., Schmidt, F., Ostertag, T., Reindl, L., Scherr, H. and Wolff, U., "Wireless Passive SAW Sensor Systems for Industrial and Domestic Applications." 1998 IEEE International Frequency Control Symposium, pp. 595-601.

Pohl, Alfred, Seifert, Franz, "New Applications of Wirelessly Interrogable Passive SAW Sensors", IEEE Transactions on Microwave Theory and Techniques, vol. 46, No. 12, Dec. 1998, pp. 2208-2212.

Mrosk, J. W. et al, "SAW Sensors for High Temperature Applications." IEEE, 1998, pp. 2386-2390.

Reindl. L., Pohl A., Scholl, G., and Weigel, R., "SAW-Based Radio Sensor Systems." IEEE Sensors Journal, vol. 1, No. 1, Jun. 2001, pp. 69-78.

* cited by examiner

Figure 1.

Figure 2. 2a – top graph – impulse response; 2b – bottom graph – frequency response spectrum

SAW TEMPERATURE SENSOR AND SYSTEM

This application claims the benefit U.S. provisional application No. 60/714,587 filed on Sep. 7, 2005.

BACKGROUND OF THE INVENTION

The present invention generally relates to methods and devices for remotely measuring temperature. Measurement of temperature is important for a wide range of applications in almost every field. In many applications, the ability to measure temperature wirelessly provides significant advantages. One such application is the measurement of patient temperature in hospital applications. Traditional techniques used to monitor patient temperature were labor intensive and intermittent, relying mainly on hospital personnel to measure patient temperature with standard thermometers. Recently, radio frequency identification device (RFID) technology has been merged with temperature sensing technology to produce systems capable of remote sensing of temperature. One such system is the "Smart Sense 100" system introduced by Cadi Scientific Pte Ltd. (http://www.cadi.com.sg). This system uses a small temperature sensor module in the form of a disc, which is pasted onto the patient's body using a medical adhesive dressing. This module can be activated, and interacts with a networked system to allow hospital personnel to continuously monitor the patient's temperature. The modules provide both a measurement of temperature and a unique device identification, so that many of these devices can be used simultaneously to track the temperature of multiple patients. This sensor module includes components such a temperature sensor, a memory device, associated electronics, an antenna, and possibly a battery manufactured as a unit within a durable case.

A number of SAW temperature sensor devices are well known in the art. SAW temperature sensors that utilize various device structures have been demonstrated, including resonators, delay lines, differential delay lines, and reflective delay lines (or "tags"). These devices have been developed for measurement of temperature and other parameters, and have been used in both wired and wireless systems. All of these sensors operate by producing a change in the resonant frequency of the device response or a change in the delay (or delays) of the device response. These changes can be measured in a wired or wireless system. The measurement system used with each type of sensor is designed to operate with the selected SAW temperature sensor or sensors. Interrogation systems for SAW sensors have been demonstrated that include pulsed radar architectures, Fourier transform measurement systems, software-radio systems (which digitize the data and perform signal processing in software) and delay line and resonator-based oscillator systems. In general, all of these systems have the common elements of: RF signal generation, amplification, and transmission through an antenna to the sensor; RF signal reception through an antenna of the sensor response; amplification, signal processing, down-mixing, and digitizing of the sensor signal response; and digital data analysis to determine sensor response. Since SAW devices are linear, coherent systems can be used. Quadrature demodulation can be implemented in the receiver unit before sampling and digitizing. Reading the SAW sensor takes only a few microseconds, which allows for time integration of the sensor response over a short time period to include many RF responses. This enhances the signal-to-noise ratio (SNR), and each 12 dB increase in SNR doubles the device read-out distance. One additional interrogation system technique that is known is the reflective power spectral density (PSD) measurement system described in U.S. Pat. No. 7,100,451. This system is unique in that it measures the frequency PSD of the reflected sensor response, rather than measuring the resonant frequency or delay characteristics of the sensor device. It is this measurement system that is the most useful for measuring the present invention, a high precision temperature sensor.

SUMMARY OF THE INVENTION

The subject of the present invention is a SAW (surface acoustic wave) temperature sensor and system for remotely sensing temperature with high precision. The system includes a sensor and an interrogator. The sensor is a hermetically sealed SAW device attached to a small antenna. Since there is no power source in or connected to the sensor, it is a completely passive sensor. As such the device is elegantly simple, low-cost, and rugged. A radio frequency (RF) signal is transmitted by the interrogator, received and processed by the sensor, and the modified signal is radiated back to and received by the interrogator. The reflected signal returning from the sensor contains the temperature information. The same reflected signal contains two metrics which specify the temperature for added reliability, i.e., the amplitude and the delay of the reflected signal each independently provide a metric which specifies the temperature. Furthermore, the sensor can be given a unique ID which allows the interrogator to identify and query a large number of sensors individually.

Previously described passive SAW sensors either use the frequency of a resonator or the time delay of a delay line as the parameter for indicating temperature. This sensor is fundamentally different from either of these techniques in than it generates a reflective transversal filter response (known as the S-parameter $S_{11}$), the PSD of which is an indicator of the temperature. This sensor, when used in conjunction with the interrogation system described herein, demonstrates substantially higher temperature sensitivity than that achievable using previously known SAW sensors of all kinds. Three embodiments of the sensor are shown in FIGS. 1 and 3 through 5. In the embodiments shown in FIGS. 1, 3, and 4, the sensor must have at least one SAW transducer and at least two SAW reflectors positioned in two nonparallel acoustic tracks. When used in a wireless interrogation system the transducer is electrically connected to an antenna, and serves as both an input and output transducer for the signals. In the embodiment shown in FIG. 5, there are at least two transducers in each of two nonparallel tracks. When used in a wireless interrogation system, all four transducers will be connected electrically in parallel to the antenna. In all embodiments of the present invention, there must be a means of transmitting and receiving a SAW such that it propagates over a significant portion of its total path in two different nonparallel acoustic tracks.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
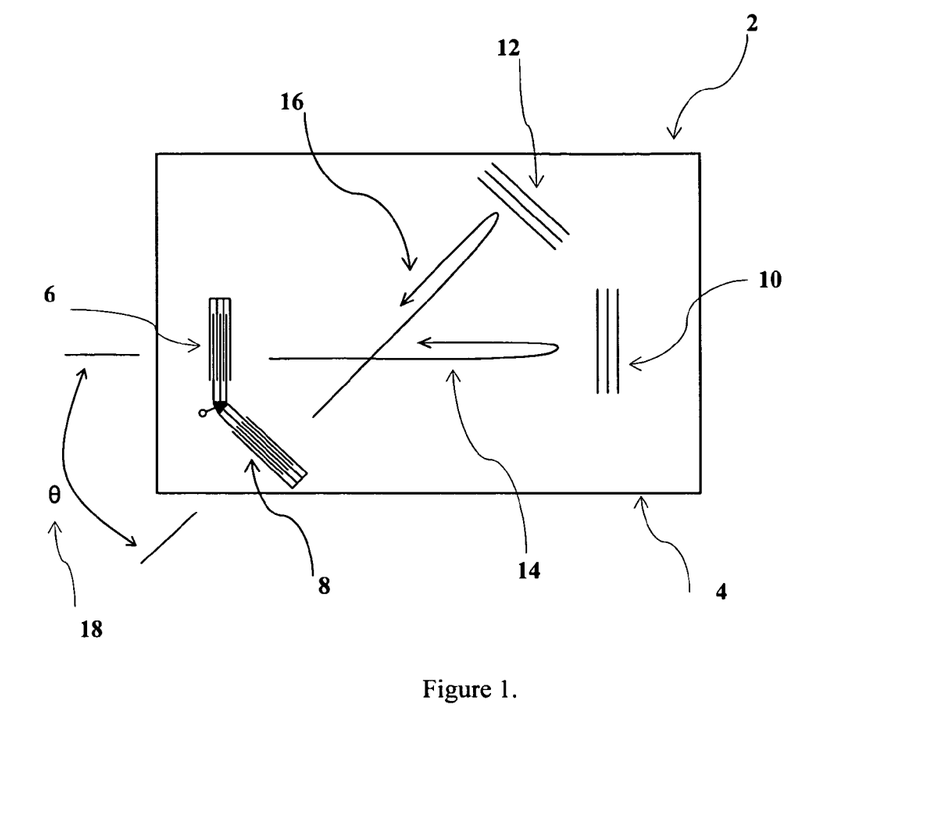
FIG. 1 is a top view of a temperature sensor device according to the invention.
Figure 2:
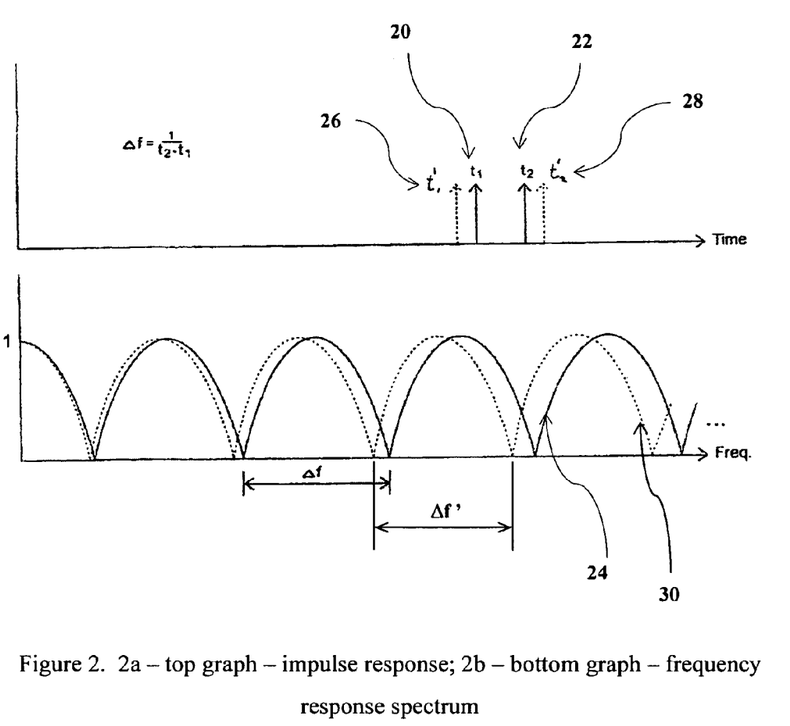
FIG. 2a is a graphical representation of the idealized impulses from the sensor of FIG. 1.
FIG. 2b is a graphical representation of the idealized frequency response for the sensor of FIG. 1.

The preferred embodiment of the present invention will be described with reference to FIG. 1. Shown therein is a SAW device 2 for measuring temperature according to the present invention. The device includes a piezoelectric substrate 4 on which are mounted two SAW transducers 6, 8 and two SAW reflectors 10, 12. These SAW elements are arranged such that they form two non-parallel acoustic tracks, 14 and 16. The angle between these tracks 18 is theta ($\theta$), where $\theta$ is greater than zero and is selected for specific desirable properties of the substrate characteristic of the orientations of the two acoustic tracks. Transducers 6 and 8, which are electrically connected in parallel, launch acoustic waves towards reflectors 10 and 12, respectively. The round trip time delay from 6 to 10 and back to 6 is $t_1$, and from 8 to 12 and back to 8 is $t_2$. When designed so that the input transducers are broadband, and the reflector elements 10 and 12 are ideal point (i.e. wide band) reflectors, the time domain reflected response resulting from interrogation of the device is a pair of impulses 20 and 22 at times $t_1$ and $t_2$ as shown in FIG. 2a. Note that $t_1$ and $t_2$ are not equal but differ by a relatively small amount as shown by the solid lines in FIG. 2a. The frequency response $S_{11}$ is shown as the solid line 24 in FIG. 2b. Note that the period of the lobes in FIG. 2b is the inverse of the time difference in FIG. 2a, i.e., $\Delta f=1/(t_2-t_1)$. In general, SAW substrates are anisotropic and have different acoustic properties in different propagation directions. The change in SAW velocity with temperature causes a change in the delay of the propagating SAW, which is defined by the temperature coefficient of delay or TCD. More precisely, the TCD is the change in the SAW delay per degree centigrade that is due to the change in the SAW velocity with temperature, divided by the total delay. We may define the TCD in tracks 14 and 16 as $TCD_1$ and $TCD_2$, respectively. Now consider what happens when the temperature changes. Both $t_1$ and $t_2$ will change, to $t_1'$ and $t_2'$ respectively, as shown in FIG. 2a (26, 28). Since $TCD_1$ and $TCD_2$ are not equal, or may be chosen to ensure that they are not, the difference between the two delays will also change, the change in differential time delay being $\delta t=(t_2 \cdot TCD_2 - t_1 \cdot TCD_1) \cdot \delta T$ where $\delta T$ is the change in temperature. The periodicity of the lobes thus becomes $\Delta f'=1/(t_2'-t_1')=1/(t_2-t_1+\delta t)$, as shown in FIG. 2b where we see that the frequency lobes have changed from the solid line 24 to the broken line curves 30. The movement of the lobes of the frequency response $S_{11}$ can be very large (on the order of tens of MegaHertz) with changes in temperature. From this we can conclude that from the change in the reflective frequency response $S_{11}$ we can determine the temperature of the substrate. It is the task of the interrogator to measure the shifting of these lobes.

Figure 3:
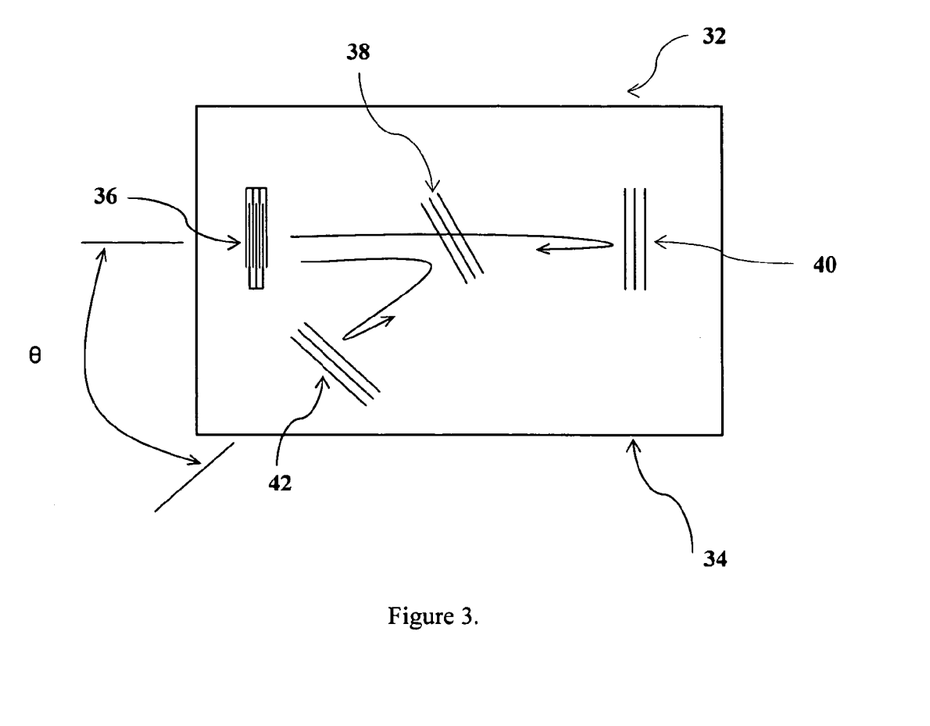
FIG. 3 is a top view of an alternate embodiment of a temperature sensor device according to the invention.
Figure 4:
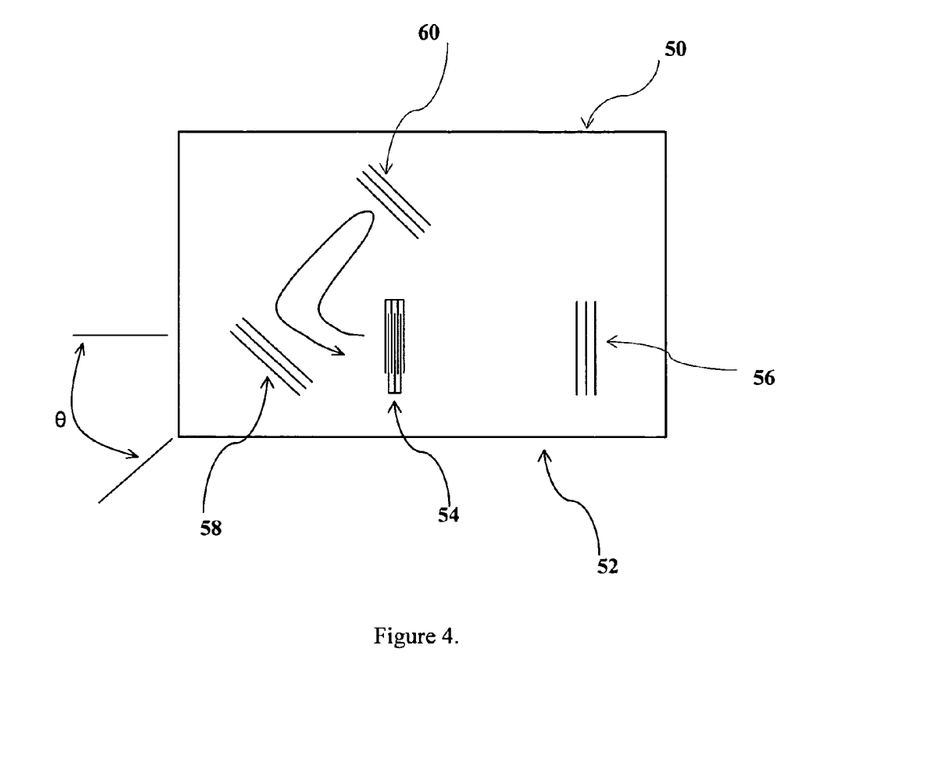
FIG. 4 is a top view of another embodiment of a temperature sensor device according to the invention.
Figure 5:
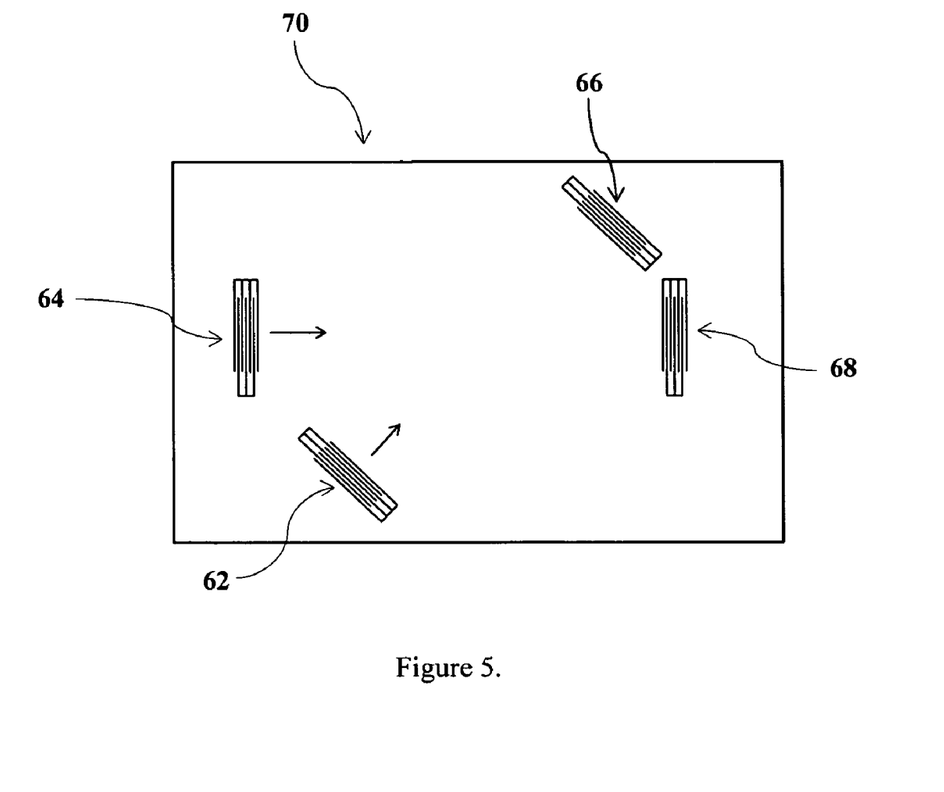
FIG. 5 is a top view of a yet another embodiment of a temperature sensor device according to the invention.

Before moving on to the interrogator it is useful to consider alternative and equivalent embodiments of the sensor as shown in FIGS. 3, 4, and 5. In the sensor device 32 of FIG. 3 there is one SAW transducer 36 mounted on a piezoelectric substrate 34 for launching and receiving the SAW. Reflector 38 is a partial reflector for splitting the SAW into two tracks. Roughly half of the SAW energy is reflected into the second track toward reflector 42 and the other half continues on to reflector 40. The path in the launching track from 36 to 38 is common to both time delays $t_1$ and $t_2$ so does not contribute toward the difference in delays that produces the lobed frequency response. The delay from 38 to 42 and back to 38 can be defined as $t_2$ and the delay from 38 to 40 and back to 38 can be defined as $t_1$. Then the same discussion pertaining to the sensor of FIG. 1 can be used to describe the operation of the sensor of FIG. 3. A third embodiment that is equivalent to the others is shown by the sensor device 50 in FIG. 4. We can define $\delta t''$ as the delay from 54 to 58 and back to 54. Then $t_1$ is defined as the delay from 54 to 56 and back to 54 minus $\delta t''$, and $t_2$ is defined as the delay from 58 to 60 and back to 58. Then the same discussion pertaining to the sensor of FIG. 1 can be used to describe the operation of the sensor of FIG. 4. A fourth embodiment that is equivalent to the other three is shown by the sensor device 70 in FIG. 5. In this embodiment there are no reflecting elements but rather four transducers 62, 64, 66, 68. The two transducers 64 and 68 in the first track form a delay line with time delay $t_1$, and the two transducers 62 and 66 in the second track form a delay line with time delay $t_2$. Although it is not illustrated in the figure, all four transducers will be electrically connected in parallel and connected to the antenna when used in a wireless system. As in the previous embodiments the responses of the two tracks are summed together and form a reflective transversal filter response $S_{11}$. The two taps with time delays $t_1$ and $t_2$ create a frequency response with periodic lobes which shift in frequency with changes in temperature. The system interrogator is able to determine the temperature of the sensor by sensing the relative movement of the lobes of the $S_{11}$ response.

In any embodiment of the sensor a transducer is placed on the substrate in a propagation direction which we can define as track 1. That propagation direction must have a high piezoelectric coupling constant and a desirable (the meaning of which will be discussed later) $TCD_1$. A second direction is needed, which we can define as track 2, that also must have a desirable $TCD_2$ (different from $TCD_1$). For the structures in FIGS. 1 and 5 there is also the requirement that the piezoelectric coupling constant in track 2 must be high because there are transducers in that track. For the structures of FIGS. 3 and 4 there is no transducer in track 2 so there is no requirement that the coupling constant be high. Therefore it may be easier to find a suitable substrate if there is no requirement on the coupling factor in the second track. In general, the requirement on the choice of TCD for the two tracks is that they differ by as large an amount as possible. In this way the lobes, as shown for example in FIG. 2b, will be as responsive to temperature as possible.

If the sensor is used in an environment where more than one sensor is present it will be desirable to code or ID each sensor so that each one can be individually identified. This can be done by replacing the wide band reflectors (10 and 12 in FIG. 1) with coded wide band reflectors. These reflectors could be PN, MSK, PSK, OFC, FM, or any of a wide variety of coding techniques. Whatever code is used in the sensor must be replicated in the interrogator to achieve sensor identification.

Now that the various sensor embodiments have been described, we will consider the interrogation system. As was discussed above, the amplitude response of the sensor in the frequency domain is a series of identical lobes separated by nulls as was shown in FIG. 2b. Changes in temperature cause the separation between nulls Δf to increase or decrease. Since mathematically the 1$^{st}$ lobe is always centered at zero frequency, the lobes and nulls shift up and down with temperature as shown by the dotted line. It is the shift in frequency of the lobes that is the indicator of temperature, and it is one of the tasks of the interrogator to measure this shift in frequency. In addition to the amplitude response, the delay of the reflected filter response provides a second metric that is an indicator of temperature. This is useful for two reasons. First, two metrics can provide a more reliable or robust measurement system, and secondly, for wider ranges of temperature one metric that is used to measure temperature can have a turn over point in which temperature region the one metric will not provide useful temperature readings, but at that point the second metric will provide continuous temperature data.

Figure 7:
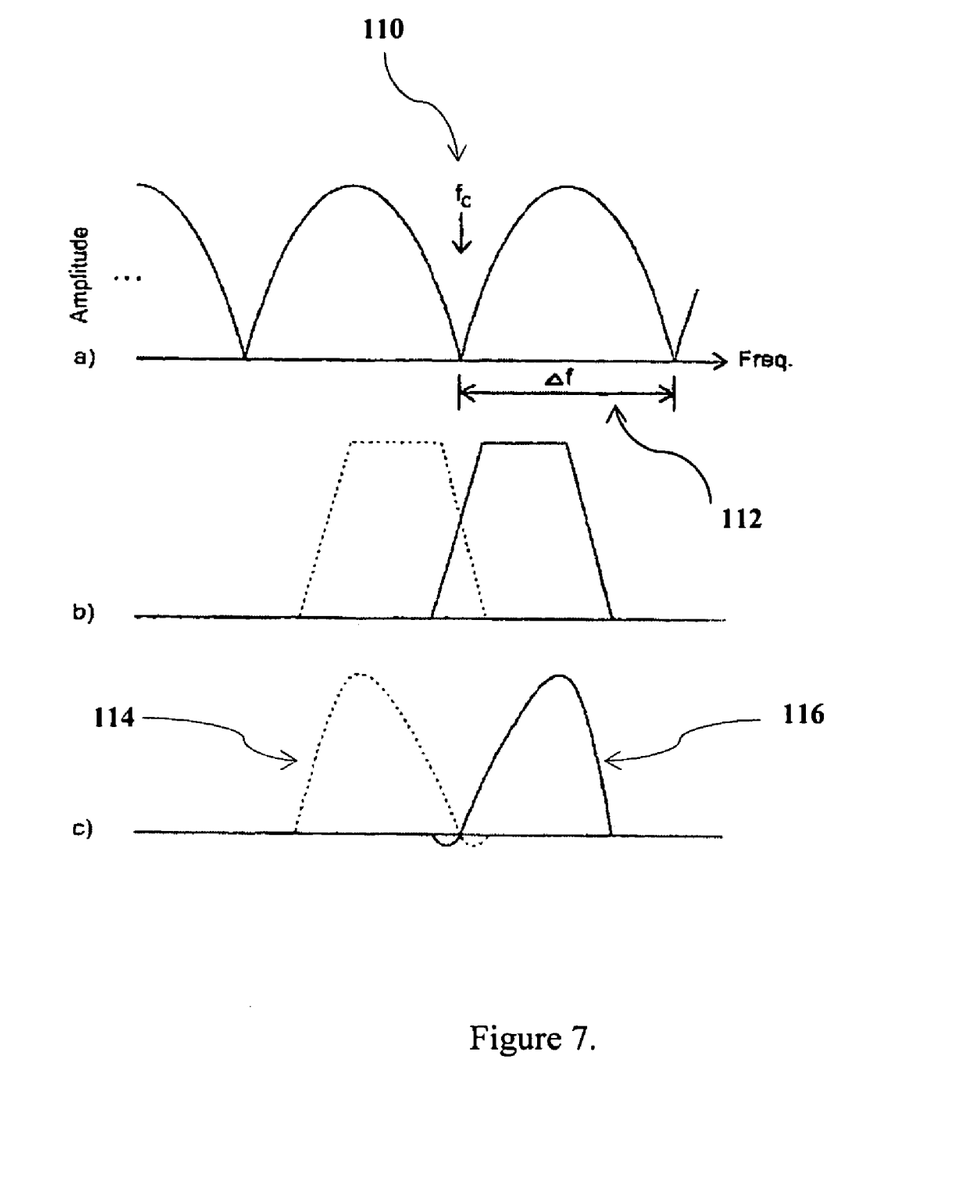
FIG. 7a is a graphical representation of the frequency response of the sensor for use in the system of FIG. 6 at reference temperature.
FIG. 7b is a graphical representation of the frequency responses of the filters in the system of FIG. 6.
FIG. 7c is a graphical representation of the frequency responses at the outputs of the multipliers of the system of FIG. 6 when the system is at the reference temperature.
Figure 8:
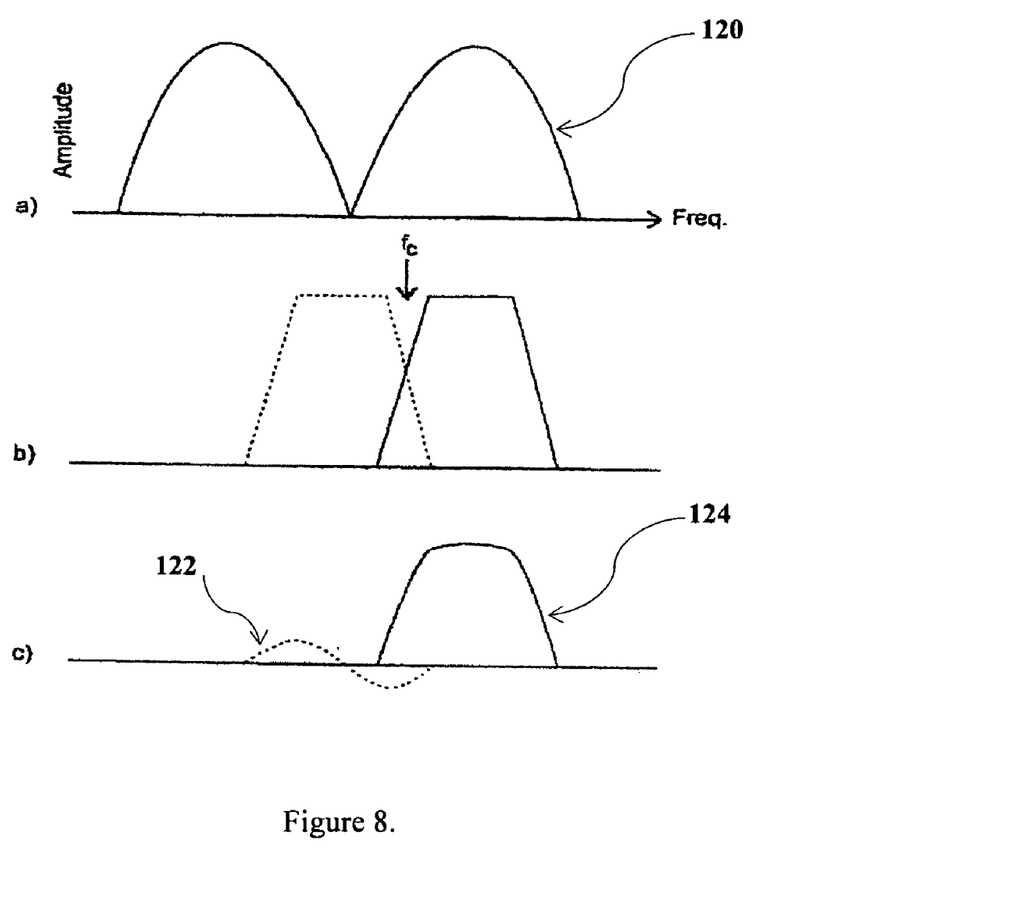
FIGS. 8a-c show frequency responses similar to FIGS. 7a-c, respectively, for the temperature sensing system of FIG. 6 when the system temperature differs from the reference temperature.

The interrogator that is most useful for measuring the sensor of the present invention is the reflective power spectral density (PSD) measurement system described in U.S. Pat. No. 7,100,451, a preferred embodiment of which is shown in the wireless temperature sensor system 80 of FIG. 6. A pseudo-noise (PN) source 82 supplies a voltage to node 84. Before being transmitted to the sensor the frequency power spectral density of the signal is flat. This signal is amplified and applied to the antenna at node 86. That signal is received by the target sensor 88 and reflected back to the interrogator where it appears as a voltage at node 86. This signal is called the sensor response signal. While passing from node 84 to node 86, propagating to the sensor 88, and returning to node 86 the signal experiences a delay T. After being reflected back from the sensor the amplitude of the frequency response of the sensor response signal at ambient temperature is the lobed response 24 shown by the solid line in FIG. 2b, the relevant portion of which is also shown in FIG. 7a. The location of one of the nulls is defined as $f_c$ (110) and the spacing between nulls is Δf (112). The amplifier 94 blocks the returned signal from going back to node 84, and it is applied to one of the input ports of the multipliers 90 and 92. The same noise signal at node 84 which is the source of the interrogation signal is applied to a pair of filters 96 and 98. FIG. 7b shows the frequency responses of the two filters shown in FIG. 6 as filter #1 (96) and filter #2 (98). Note that these responses cross at $f_c$. This delayed signal, which is called the reference signal, is filtered and delayed by the filters 96 and 98 and then applied to the second inputs of the multipliers 90 and 92. The power spectral densities at node 100 and 102 are shown in FIG. 7c as the dotted and solid lines, respectively. The delays through the two filters 96 and 98 (which may be SAW filters) are identical and are equal to the delay through the sensor response path. In that case, at each frequency the sensor response signal applied to multipliers 90 and 92 are identical in phase and delay to the reference signals at nodes 100 and 102 so the multiplier outputs are the square of the noise signal component (i.e., a positive DC level) times the product of the spectra of 7a and 7b as shown in 7c. The baseband signal level at node 104 is a positive DC level which is the frequency integral of the curve shown as the dotted line 114 in FIG. 7c which in turn is the product of the curve in FIG. 7a times the dotted line in FIG. 7b. Likewise for the voltage at node 106 which is the solid line 116 in FIG. 7c integrated over frequency. The integrated outputs at nodes 107 and 108 are the time integrals of curves 114 and 116 of FIG. 7c, respectively, and the integration over time is according to the time constant of the RC integration circuit. The frequency integration performed at the outputs of the multipliers (nodes 104 and 106) typically result in very weak and noisy DC levels, but when these signals are integrated over time the output levels at nodes 107 and 108 are increased to useful signal levels. The increase in signal levels between node 104 and node 107 and between node 106 and 108 is a result of the processing gain which can increase the output levels several orders of magnitude. In the example shown in FIG. 7 the levels of the signals at 107 and 108 are equal because of the symmetry of the curves in FIG. 7c, and the ratio of the output levels is 1.0. This ratio is the parameter that indicates the temperature, i.e., a lookup table or a proportionality relationship can be established between this ratio, henceforth called the output ratio, and temperature. Now assume that the sensor is exposed to a change in temperature in which case the sensor response signal is shifted in frequency as shown in FIG. 8a, 120. Since the temperature of the interrogation unit is assumed constant and the filters are fixed, the reference signal through filters #1 and #2, 100 and 102, are not shifted and cross at frequency $f_c$ as before. The outputs 104 and 106 of the multipliers 90 and 92 are shown in FIG. 8c. Note that the signal at node 104, shown as the dotted line in FIG. 8c, or 122, consists of two lobes and these are of opposite sign so that when they are integrated they are subtracted and can in fact cancel so the integrated output at node 107 is small. The signal at node 106, however, as shown by the solid line 124 in FIG. 8c, is positive, and the integration of this signal will produce an output at node 108 that is larger. The ratio of the voltages at nodes 108 and 107 is a large number which can be associated with a specific temperature. Note that the absolute value of the voltages at nodes 108 and 107 will vary with integration time and with reflection loss from the sensor, but the ratio between these voltages will not be affected by these variations and so will be an accurate indicator of temperature.

Figure 6:
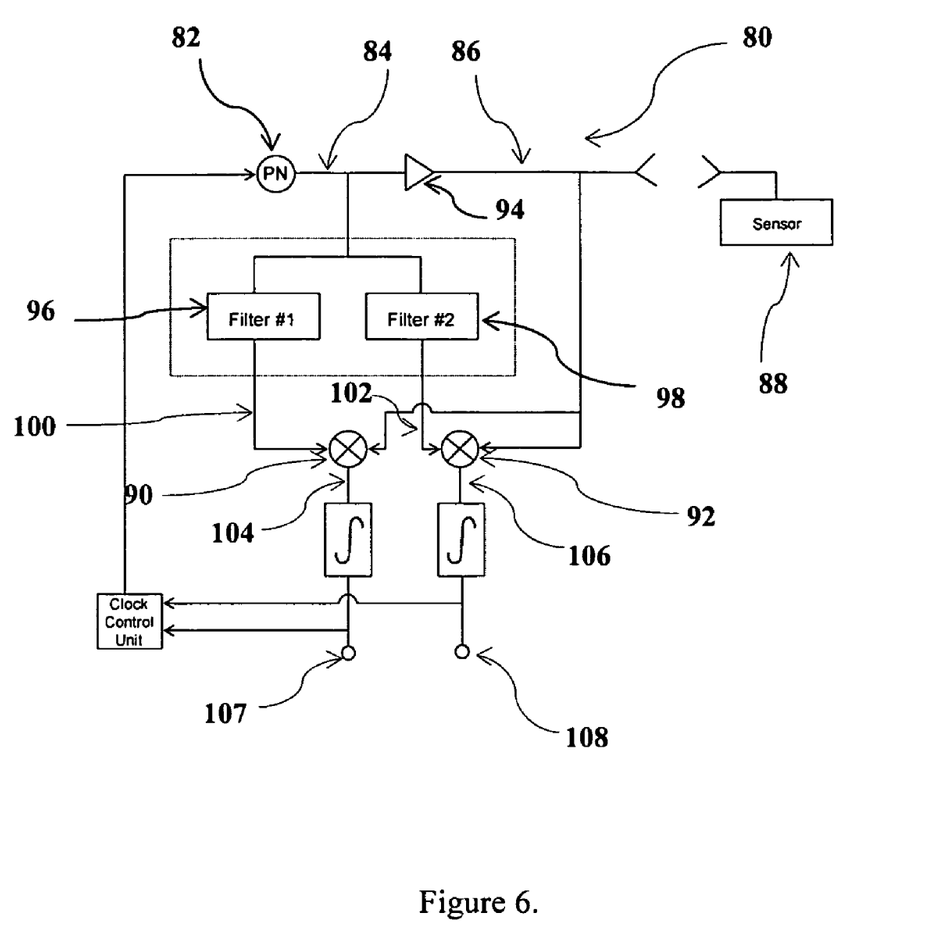
FIG. 6 is a block diagram of a temperature sensing system according to the invention.

The discussion of the system represented in FIG. 6 has thus far assumed that the delay in the reference path is exactly the same as the delay through the sensor response path, a condition critical for success of the process. This measurement approach will only work if the delays between the two paths are equal. This is actually a very useful feature of the system because it means that the signal directly from the amplifier (at node 86) that appears at the multipliers will not correlate because the delay does not match the delay through the filters, and thus the product of these signals is a noise signal which changes sign randomly and thus integrates to zero. This feature avoids this transmitted signal from interfering with the measurement process. However, for successful measurement of the sensor(s), delay matching must be accomplished. The difficulty in matching the delays in the sensor response and reference paths can be eased by using a source which has a noise power spectrum similar to white noise but that is periodic in time, with an adjustable periodicity. One class of signals that has these properties are PN (Pseudo-Noise) codes. These codes are well known in the field of signal processing. A PN code consists of a sequence of M bits which repeat indefinitely, where M=2$^N$+1 and N is any integer. Each bit can assume a value of +1 or −1. A RF signal modulated by a PN code the length of which is controlled by a clock control unit is an example of such a source. The value of this embodiment is that it is not necessary to implement a delay in the reference path to match the delay in the interrogation path, but rather the length of the repeating signal in the reference path can be varied up to one (or more integral) code lengths. In this manner the signals applied to the two inputs of the multiplier can be forced to line up exactly even though their delay paths differ by an integer multiple of a full code length. It may be noted that the signals will not automatically line up since the delays can change with position or temperature, but rather variation of the bit rate from the clock control unit changes the time length of the PN code. The code sequence remains the same, but the length of the code increases or decreases, i.e., scales with time as the clock rate is varied. In fact the clock rate or bit rate defines a particular "effective delay" between interrogation and reference signals which corresponds to a particular temperature, so that by varying the clock rate to maximize the total signal out of the integrators, the corresponding clock rate will be a second direct measurement of the temperature. The ratio of the outputs at nodes 108 and 107 is the first or primary measurement of the temperature. The clock rate is a metric which is affected by the average time delay or more specifically by the average of $TCD_1$ and $TCD_2$, whereas the ratio of outputs at nodes 108 and 107 is affected by the difference between $TCD_1$ and $TCD_2$. These are two independent and complimentary ways of determining the temperature.

The time integrating correlation process described herein involves the integration of a low level dc signal, and results in very significant levels of processing gain. As a typical example, if the noise bandwidth of the signal at the multiplier is 200 MHz and the effective integration time of the integrator is 10 milliseconds, then the processing gain is 2,000,000 or 63 dB. This can be regarded as a direct amplification of the information signal with respect to the noise signal. The interrogation system presented in FIG. 6 thus provides an approach for interrogating a passive sensor with enormous processing gain. The operation of a time integrating correlator capable of large processing gain is well known in the field of signal processing. It will be understood by one skilled in the art that the embodiment of the interrogation system shown in FIG. 6 can be implemented with many variations. The noise source may be a white noise generator, a pseudo noise generator (i.e., PN code generator), or any other wide band signal generator. The delay line could be a SAW delay line; the multiplier, a diode or diode array; and the integrator, a simple RC circuit. The time constant of the RC circuit is the effective integration time.

The interrogation system described herein is capable of identifying and tracking individual sensors in an environment in which there are multiple sensors within the range of the interrogator by using a built-in code or ID in each sensor. This capability is described in connection with the sensor where it was stated that a coded reflector was placed at each of the two ends of the acoustic path, e.g., reflectors 10 and 12 of FIG. 1. In the sensor there is a SAW transducer that launches the received noise signal and directs it toward the two reflectors. The surface acoustic waves are reflected back to the transducer by the coded reflectors where the two waves are received and transmitted back to the interrogating system. In the process of being reflected the interrogating signal is convolved with the coded signal, i.e., it is given a unique signature that can be recognized when the response signal is received by the interrogator. The implications that this has upon the interrogator are as follows. We know that for the time integrating correlator to function properly the two signals applied to the inputs of the multipliers must be nearly identical (except for amplitude levels). This means that if the interrogating signal has been convolved by the coded signal (as it has by the coded reflectors in the sensor), then the reference signal must also be convolved by that same coded signal. That can be done by incorporating the code into the SAW device or devices in the interrogator, i.e., the bandpass filters. The easiest, but by no means the only way, to implement this is by designing a SAW device in which one of the transducers (input or output) of the bandpass filter is coded. In this manner the reference signal is convolved with the same code or ID that is found in the sensor. Multiple sensors can operate in the same environment, but the time integrating correlator will only recognize a signal if the code in the sensor and the interrogator are the same. If coding of the sensors is not desired the reflectors (or transducers) in the sensors can be "wide band" reflectors (or transducers), i.e., reflect (or transducer) everything, and no code would be used in the interrogator.

It will be apparent to those of ordinary skill in the art that invention described herein can be implemented as a single or multiple sensor system, with wired or wireless communication between the transceiver and the sensor(s). It would also be obvious to one skilled in the art that the two acoustic tracks with different TCDs discussed could be implemented by forming two separate devices on two different substrates and using them together. Multiple transceivers and/or signal repeaters may be utilized for large multi-sensor systems. Practical systems utilizing the invention may include a computer, microprocessor, or other calculating devices, and associated software. Such systems may include the ability to uniquely identify individual sensors and the data therefrom. Additional aspects of a practical system utilizing the invention include the ability to store data and calculation results, and devices for transmitting the data and/or results to entities interested in the results. Such transmission of information may include but is not limited to communicating to external computers, web sites, cell phones, and other devices.

While the preferred forms and embodiments of the invention have been illustrated and described, it will be apparent to those of ordinary skill in the art that various changes and modification may be made without deviating from the inventive concepts set forth above.

What is claimed is:

1. A temperature sensor, comprising
    (a) at least one piezoelectric substrate;
    (b) a first SAW element comprising a transducer formed on a region of said at least one piezoelectric substrate for transducing a signal;
    (c) at least three additional SAW elements formed on said at least one piezoelectric substrate; and
    (d) two acoustic wave propagation paths that are non-parallel relative to the crystal axes of the substrates, defined by the SAW elements and having different temperature coefficients of delay, wherein the responses from the two acoustic tracks are combined to produce a signal with a power spectral density such that integration of power within each of two specified portions of the spectrum provide an indicator of the temperature.

2. A temperature sensor as defined in claim 1, wherein said three additional SAW elements comprise transducers, and wherein two transducers are contained in each acoustic track.

3. A temperature sensor as defined in claim 1, wherein said three additional SAW elements comprise one transducer and two reflectors, and wherein one transducer and one reflector are contained in each acoustic track.

4. A temperature sensor as defined in claim 1, wherein said three additional SAW elements comprise reflectors.

5. A temperature sensing system comprising:
    (a) at least one temperature sensor comprising
        (i) at least one piezoelectric substrate;
        (ii) a first SAW element comprising a transducer formed on a region of said at least one piezoelectric substrate for transducing a signal;
        (iii) at least three additional SAW elements formed on said piezoelectric substrate; and (iv) two acoustic wave propagation paths that are non-parallel relative to the crystal axes of the substrates, defined by the SAW elements and having different temperature coefficients of delay, wherein the responses from the two acoustic tracks are combined to produce a signal with a power spectral density such that integration of power within each of two specified portions of the spectrum provide an indicator of the temperature; and (b) an interrogator which transmits an interrogating signal to said at least one temperature sensor and receives the response signal from said at least one temperature sensor and, said interrogator including (i) a voltage source for providing the interrogating signal;

(ii) a communicating device for transmitting the interrogating signal to said at least one temperature sensor and and for receiving the response signal therefrom; and (iii) a signal processor for calculating the integrated power within each of said two portions of the frequency spectrum to produce a metric corresponding to the temperature.

* * * * *